(12) United States Patent
Vipond et al.

(10) Patent No.: US 11,702,158 B2
(45) Date of Patent: Jul. 18, 2023

(54) TRACK SHOE AND TRACK ASSEMBLY FOR TRACKED VEHICLES

(71) Applicant: Epiroc Drilling Solutions, LLC, Garland, TX (US)

(72) Inventors: Erik Vipond, Rowlett, TX (US); James Hannah, Garland, TX (US); Caleb Obholz, Royse City, TX (US)

(73) Assignee: Epiroc Drilling Solutions, LLC, Garland, TX (US)

( * ) Notice: Subject to any disclaimer, the term of this patent is extended or adjusted under 35 U.S.C. 154(b) by 552 days.

(21) Appl. No.: 16/884,275

(22) Filed: May 27, 2020

(65) Prior Publication Data
US 2021/0371023 A1 Dec. 2, 2021

(51) Int. Cl.
*B62D 55/28* (2006.01)
*B62D 55/20* (2006.01)

(52) U.S. Cl.
CPC ............. *B62D 55/28* (2013.01); *B62D 55/20* (2013.01)

(58) Field of Classification Search
CPC ................................ B62D 55/28; B62D 55/20
See application file for complete search history.

(56) References Cited

U.S. PATENT DOCUMENTS

| | | | |
|---|---|---|---|
| 1,258,608 A * | 3/1918 | Turnbull | B62D 55/28 305/191 |
| 1,304,357 A * | 5/1919 | Norelius | B62D 55/28 301/44.3 |
| 1,421,270 A | 6/1922 | Mcmullen | |
| 3,278,244 A | 10/1966 | Deffenbaugh | |
| 3,362,492 A | 1/1968 | Hansen | |
| 3,937,529 A | 2/1976 | Becker et al. | |
| 4,026,608 A * | 5/1977 | Becker | B62D 55/286 305/191 |
| 4,036,538 A | 7/1977 | Haslett et al. | |
| 4,043,610 A | 8/1977 | Halmosi et al. | |
| 4,123,119 A | 10/1978 | Stedman | |

(Continued)

FOREIGN PATENT DOCUMENTS

| | | |
|---|---|---|
| WO | WO1982003050 A1 | 9/1982 |
| WO | WO1983003582 A1 | 10/1983 |
| WO | WO2019016431 A1 | 1/2019 |

OTHER PUBLICATIONS

Faroe Official Store, Metal track crawler 50mm track shoes, https://www.aliexpress.com/item/32799845786.html?aff_platform=dynamic-window&sk=AMnm2vF&aff_trace_key=5304e2390ebe46209807a9f03d63563f-1585152486826-00838-AMnm2vF&terminal_id=ffb09fc9ac9c46f39eefeca0f365bfdf&aff_request_id=5304e2390ebe46209807a9f03d63563f-1585152486826-00838-AMnm2vF, retrieved Mar. 27, 2020.

(Continued)

*Primary Examiner* — Jacob D Knutson
(74) *Attorney, Agent, or Firm* — Shannon W. Bates; Harper & Bates LLP

(57) ABSTRACT

A track shoe for an endless track assembly has a base and an opposing hull. The hull of the track shoe has opposing sidewalls that are angled to meet at an apex, thus forming an inverted V-shape. The apex of the hull extends the width of the track shoe. Laterally-disposed ridges are spaced apart from the apex, and the height of the ridges tapers outwardly from the hull to form, respectively, a leading lip and a trailing lip of the track shoe. The track shoe may have upward bends at the ends of the width of the track shoe and optionally, may have secondary hulls.

19 Claims, 5 Drawing Sheets

(56) References Cited

U.S. PATENT DOCUMENTS

| | | | |
|---|---|---|---|
| 4,141,601 A * | 2/1979 | Stedman | B62D 55/28 |
| | | | 305/191 |
| 4,383,718 A | 5/1983 | Ragon | |
| 4,482,193 A | 11/1984 | Boggs et al. | |
| 4,904,557 A * | 2/1990 | Kubo | G03G 5/04 |
| | | | 347/139 |
| 5,390,985 A | 2/1995 | Chandler | |
| 5,429,429 A | 7/1995 | Loegering et al. | |
| 5,573,310 A | 1/1996 | Rollinson | |
| 7,121,636 B2 | 10/2006 | Blank et al. | |
| 7,156,473 B2 | 1/2007 | Hori et al. | |
| 8,678,522 B2 | 3/2014 | Fischer et al. | |
| 9,004,619 B2 | 4/2015 | Meyer et al. | |
| 9,102,370 B2 | 8/2015 | Freeman | |
| 9,446,802 B2 | 9/2016 | Weiss et al. | |
| 9,446,805 B2 | 9/2016 | Ellmann | |
| 9,862,436 B2 | 1/2018 | Burling | |
| 10,196,102 B2 | 2/2019 | Pattyn | |
| 10,344,451 B2 | 7/2019 | Kaufmann et al. | |
| 2004/0140717 A1 | 7/2004 | McNutt | |
| 2012/0146398 A1 * | 6/2012 | Nebergall | B62D 55/28 |
| | | | 305/108 |
| 2012/0299372 A1 | 11/2012 | Kruger | |
| 2013/0002009 A1 * | 1/2013 | Meyer | B62D 55/26 |
| | | | 305/40 |
| 2013/0147263 A1 | 6/2013 | Freeman | |
| 2020/0086936 A1 | 3/2020 | Gallagher et al. | |

OTHER PUBLICATIONS

XTP Track Parts, ec210-volvo-excavator-swamp-track-shoes, https://www.xtptrack.com/product/ec210-volvo-excavator-swamp-track-shoes-cat-320-caterpillar-excavator-swamp-shoes-sk260-kobelco-excavator-swamp-track-shoes-excavator-triangle-track-shoe/, retrieved Mar. 27, 2020.

Fortus, Growser bar, https://www.xtptrack.com/product/ec210-volvo-excavator-swamp-track-shoes-cat-320-caterpillar-excavator-swamp-shoes-sk260-kobelco-excavator-swamp-track-shoes-excavator-triangle-track-shoe/, accessed Mar. 25, 2020.

* cited by examiner

TRACK SHOE AND TRACK ASSEMBLY FOR TRACKED VEHICLES

BACKGROUND

Technical Field

This disclosure relates to a track shoe and endless track assembly for tracked vehicles, and is particularly suitable for work vehicles such as earth working machines, drilling machines, agricultural machines, and vehicles used in rough terrain generally.

Background

Ground-engaging endless track chain assemblies have long been employed to provide ground contact for vehicles used in construction, mining, logging, and other demanding off-road pursuits. Typical track shoes composing such assemblies comprise a plate with single, double, or triple grousers, or cleats, running across its width to increase traction. It is well known, however, that higher traction shoes tend to create more wear and tear on undercarriage components in such skid-steer vehicles, because of resistance to sideways forces and the torsional forces generated when the track is turning. The typical solution to reduce wear and tear is to reduce the width of the track shoe while increasing the number of grousers and reducing their height. Another solution, that is also common practice, is to either chamfer or bend the leading edges of the shoe. However, none of these prior-art solutions has proven completely satisfactory. What is needed is a track shoe design that will provide the optimum combination of both improved traction and improved turnability.

SUMMARY

A track shoe for an endless track assembly has a base and an opposing hull. The hull of the track shoe has opposing sidewalls that are angled to meet at an apex, thus forming an inverted V-shape. The apex of the hull extends the width of the track shoe. Laterally-disposed ridges are spaced apart from the apex, and the height of the ridges tapers outwardly from the hull to form, respectively, a leading lip and a trailing lip of the track shoe. The track shoe may have upward bends at the ends of the width of the track shoe and optionally, may have secondary hulls. An endless track assembly for a tracked vehicle may comprise a plurality of such track shoes, driven by chain links in turn moved by a sprocket wheel or equivalent mechanism.

DRAWINGS

DETAILED DESCRIPTION

Figure 1:
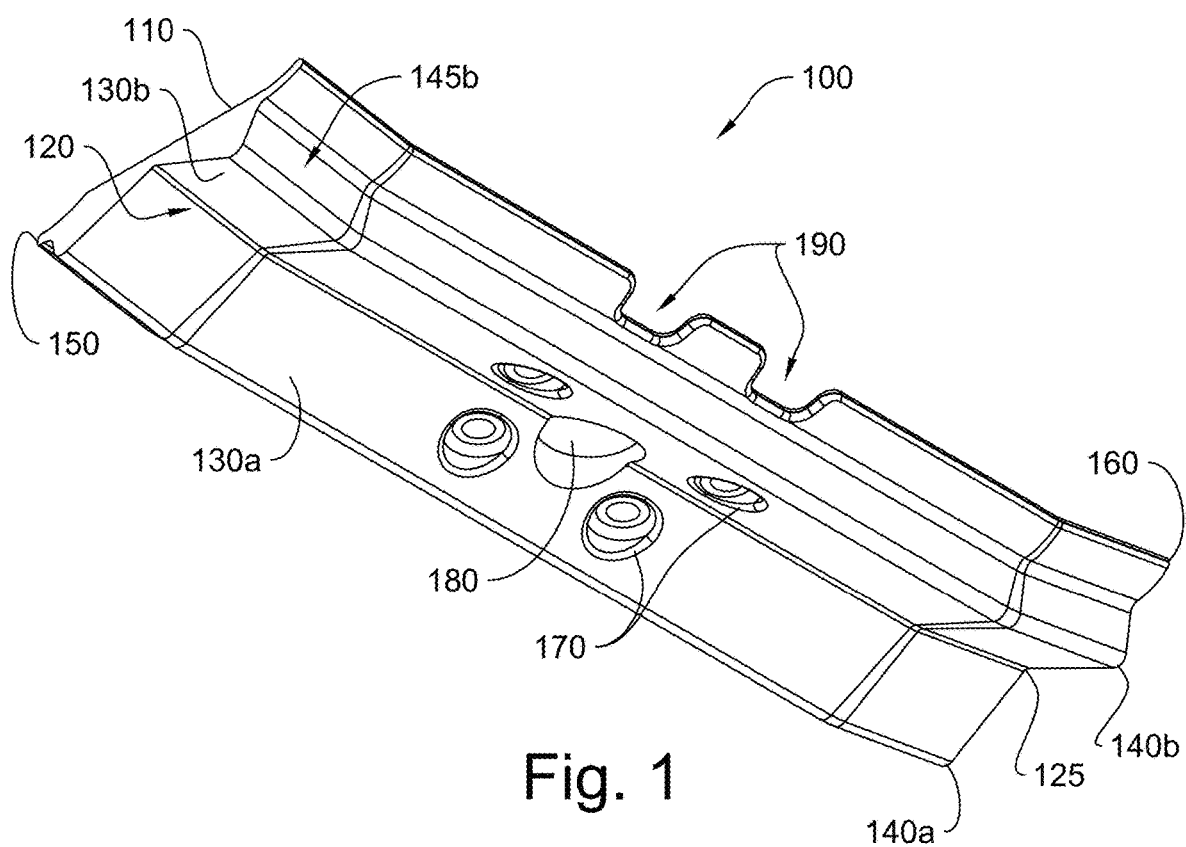
FIG. 1 is a perspective view of an embodiment of the improved track shoe.

FIG. 1 shows a perspective view of an embodiment of the improved track shoe 100. The track shoe 100 includes a substantially flat base 110, and an integral ground-engaging surface (described in more detail below), opposite the base 110. Making the ground-engaging surface integral to the track shoe 100 provides increased strength and reduced complexity in assembly. The base 110 may be configured to mate with one or more track chain links 240, as described in connection with FIG. 5 below.

The track shoe 100 comprises opposite the base 110 a hull 120. The hull 120 further comprises opposing sidewalls 130a, 130b. The opposing sidewalls 130a and 130b are angled to meet at an apex 125, forming an inverted V-shape in the track shoe 100. The apex 125 of the hull 120 extends the width of the track shoe 100 as shown in FIG. 1. The hull 120 has laterally-disposed ridges 140a, 140b spaced apart from the apex 125. The height of the ridges 140a, 140b tapers outwardly from the apex to form, respectively, a leading lip 160 and a trailing lip 150 of the track shoe.

The track shoe 100 thus offers improved traction over traditional shoes due to the V-shape of the hull 120 opposite the base 110. This feature tends to compact the material beneath the track shoe 100 and, when in a situation where the track shoe 100 begins to loose traction, the sidewalls 130a and 130b of the downward-facing hull 120 will impart a downward force into the soil, rather than simply shearing the soil as would a traditional double- or triple-grouser shoe design. Further, the ridges 140a, 140b running the width of the shoe act like the keel of a boat hull or sled rail, decreasing the force required to slide the track shoe 100 sideways. Such a combination of these two features improves turnability, which will result in reduced wear of the undercarriage components of a tracked vehicle affected by the forces on the track shoe 100. The track shoe 100 can be made as an extrusion, casting, or forging, or by 3D printing.

Figure 5:
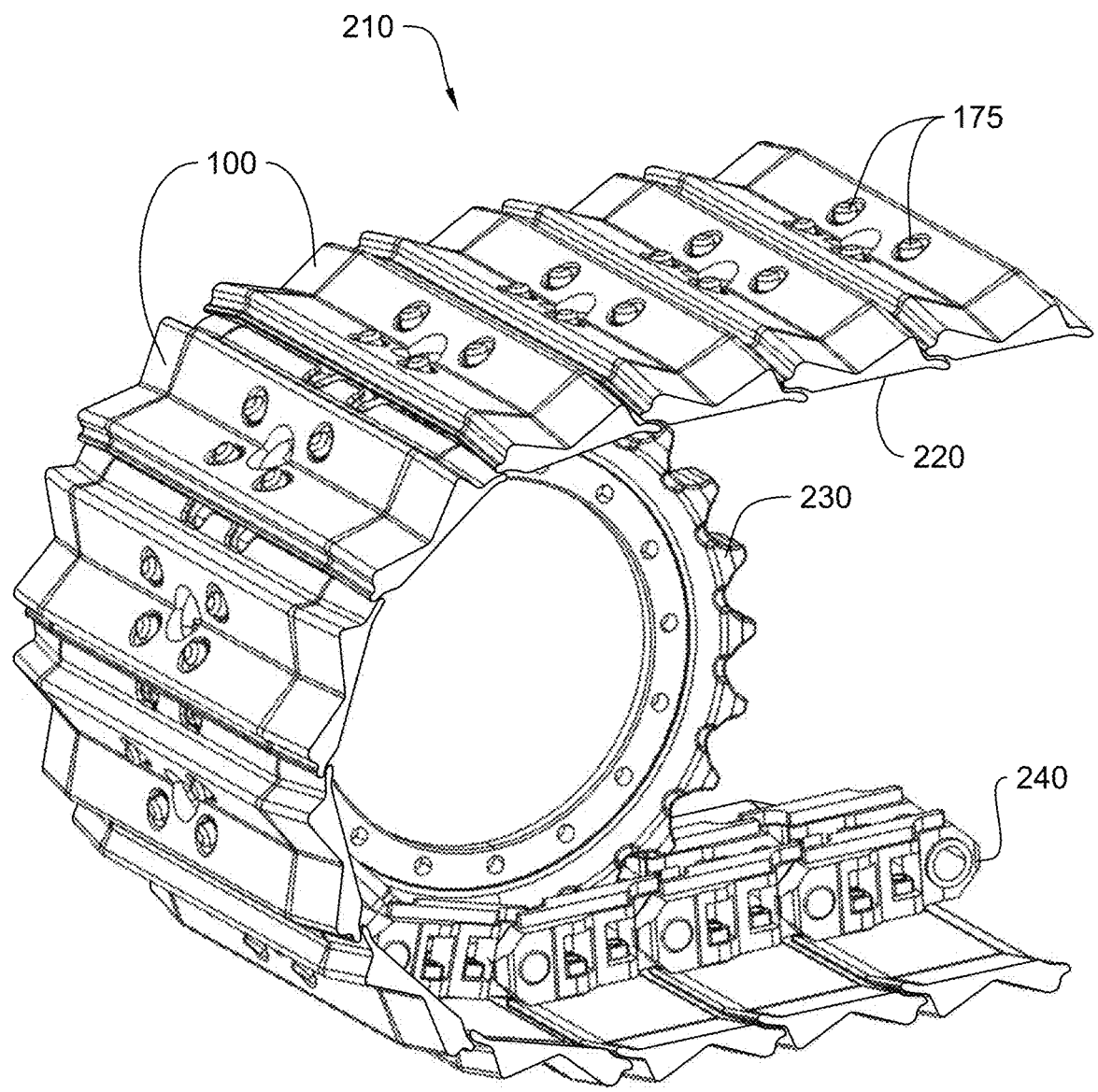
FIG. 5 is a perspective view of an endless track assembly comprising the improved track shoe.

FIG. 1 also shows a plurality of optional bolt holes 170 for attaching the track shoe 100 to the links 240 of an endless track 220, as shown in FIG. 5. FIG. 1 further shows an optional hole or holes 180 in the track shoe 100 for debris removal, also optional indentations 190 to accommodate chain links 240, as may be required in particular applications.

Figure 2:
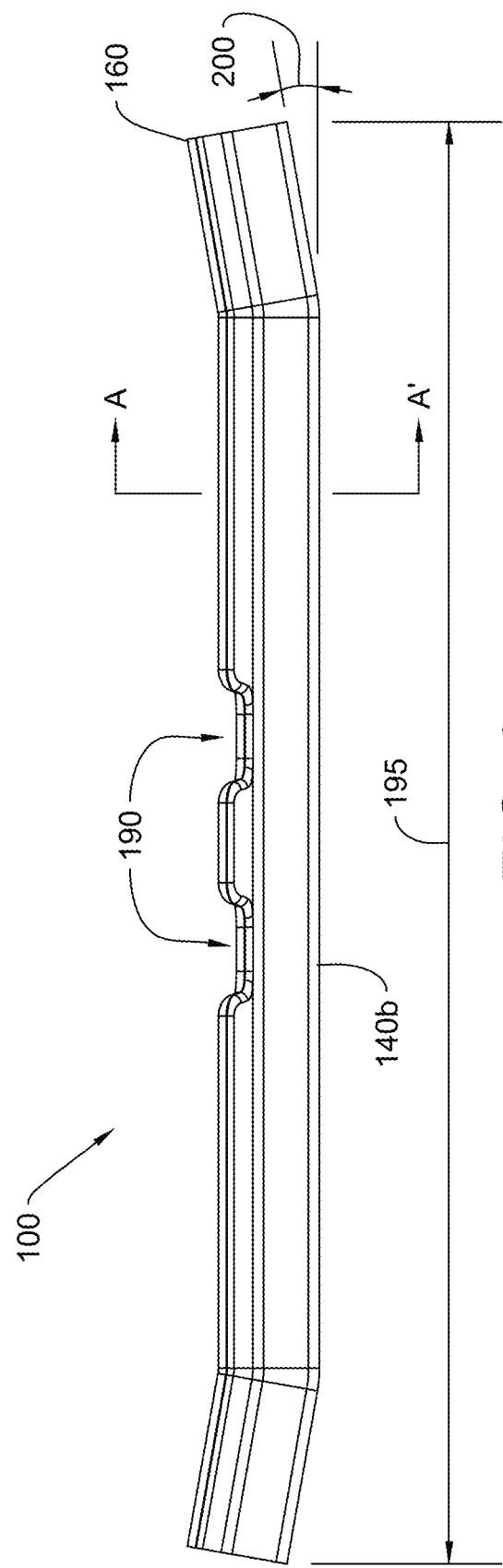
FIG. 2 is a side view of the embodiment of the improved track shoe.

FIG. 2 is a side view of the embodiment of the track shoe 100 just discussed. FIG. 2 defines the term "width" of the track shoe 100 as the width dimension 195 shown in FIG. 2, which width 195 corresponds to the extension of the track shoe 100 over the width of an endless track assembly 210, as further shown in FIG. 5. FIG. 2 shows a preferable upward bend 200 at each opposing end of the track shoe 100. (Here, "upward" is toward the base 110). The upward bend 200 is not required, but aids in the sliding movement of the track shoe 100 when the tracked vehicle is turning. The angle of the upward bend 200 from the horizontal axis of the track shoe 100 is preferably between approximately 8 and 20 degrees, and the extent of each bent area is preferably between approximately 5% and 20% of the width of the track shoe 100. However, the range of the angles and extents just suggested are not critical, but merely illustrative.

Figure 3:
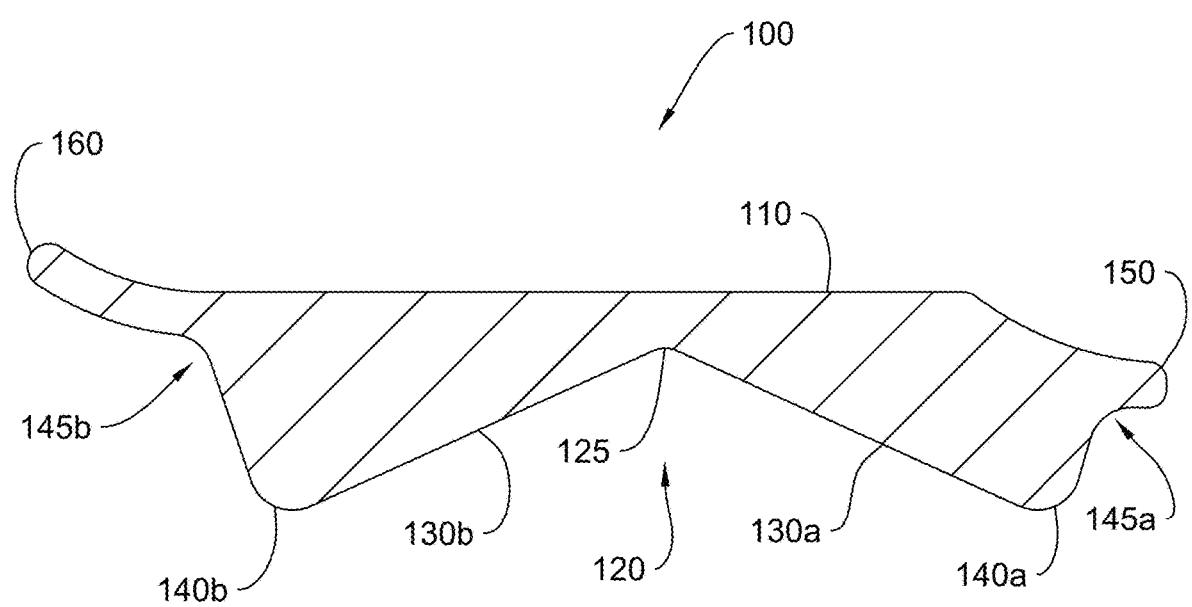
FIG. 3 is a cross-section view of the embodiment of the improved track shoe.

FIG. 3 shows a cross-sectional view of the embodiment of the track shoe 100 just discussed, taken along section A-A' as shown in FIG. 2. FIG. 3 shows the hull 120 region of the track shoe 100 and the apex 125 thereof. The reader should note that the particular details of the shape of the base 110 of the track shoe 100 depicted in FIG. 3 are not essential to every embodiment, but may be dictated by the configuration of the endless track 220 and chain links 240 of a particular tracked vehicle.

FIGS. 1 and 3 also include illustration of an alternate embodiment, where the track shoe 100 has secondary hulls 145a, 145b between ridge 140a and leading lip 160, and between ridge 140b and trailing lip 150, respectively. These secondary hulls 145a, 145b also aid traction of the track shoe 100, as already discussed, to a lesser extent.

Figure 4:
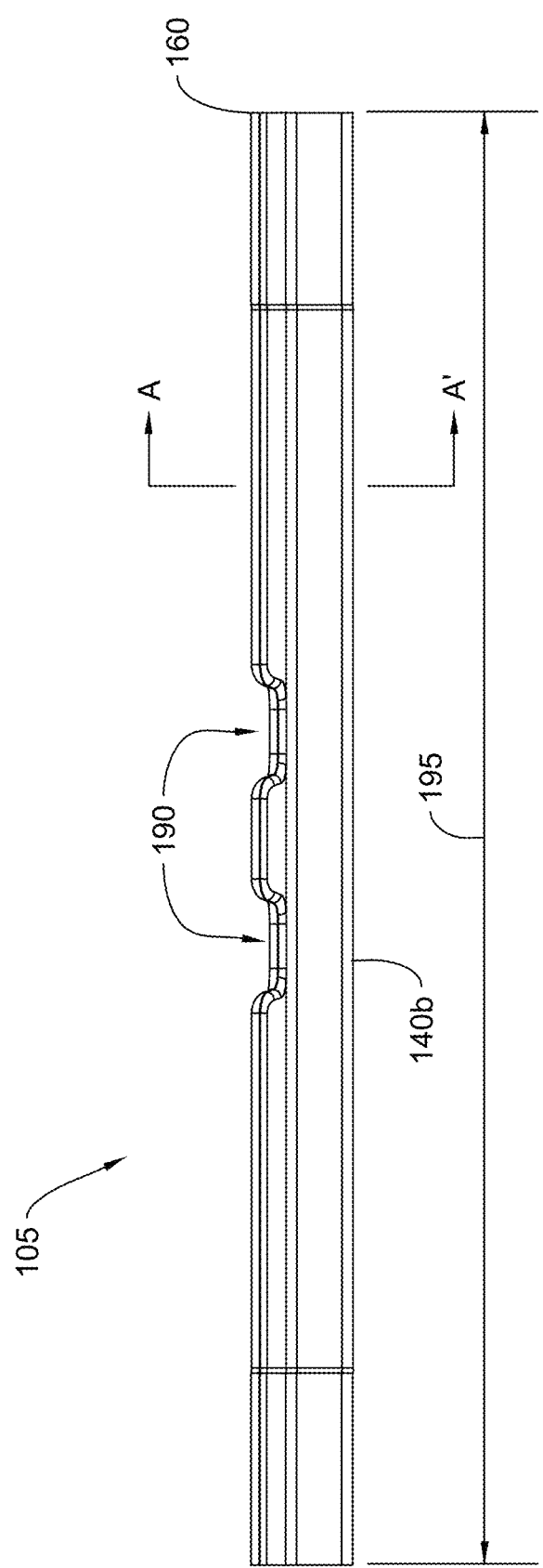
FIG. 4 is a side view of another embodiment of the improved track shoe.

FIG. 4 is a side view of an alternative embodiment of the track shoe 105, where the track shoe 100 lacks an upward bend 200.

FIG. 5 is a partial perspective view of one typical endless track assembly 210 of a tracked vehicle, showing individual track shoes 100 just described connected thereto. The endless track 220 is driven by a sprocket wheel 230 engaging chain links 240, which chain links 240 further engage the track shoes 100. Bolts 175 are shown passing through bolt holes 170 in each track shoe 100, holding each track shoe 100 to its corresponding chain link 240.

None of the description in this application should be read as implying that any particular element, step, or function is an essential element which must be included in the claim scope; the scope of patented subject matter is defined only by the allowed claims. Moreover, none of these claims are intended to invoke 35 U.S.C. Section 112(f) unless the exact words "means for" are used, followed by a gerund. The claims as filed are intended to be as comprehensive as possible, and no subject matter is intentionally relinquished, dedicated, or abandoned.

We claim:

1. A track shoe for an endless track assembly; the track shoe comprising:
   a base;
   a hull;
   the hull further comprising opposing sidewalls; the opposing sidewalls being angled to meet at an apex, forming an inverted V-shape;
   the apex of the hull extending a width of the track shoe;
   laterally-disposed ridges spaced apart from the apex; and,
   a height of the ridges tapering outwardly from the hull to form, respectively, a leading lip and a trailing lip of the track shoe.

2. The track shoe of claim 1, further comprising:
   a secondary hull formed between the laterally-disposed ridge nearest the leading lip and the leading lip.

3. The track shoe of claim 1, further comprising:
   a secondary hull formed between the laterally-disposed ridge nearest the trailing lip and the trailing lip.

4. The track shoe of claim 1, where:
   the track shoe further comprises opposing ends; and,
   each opposing end comprises an upward bend.

5. The track shoe of claim 4, where an extent of the upward bend of each of the opposing ends of the track shoe comprises between approximately 5% and 20% of the width of the track shoe.

6. The track shoe of claim 4, where the upward bends of the ends of the track shoe are at an angle between approximately 8 and 20 degrees.

7. The track shoe of claim 1, further comprising a hole for debris removal.

8. The track shoe of claim 1, further comprising indentations in the leading lip thereof to provide clearance for chain links.

9. The track shoe of claim 1, further comprising a plurality of holes for receiving bolts for attachment of the track shoe to a chain link.

10. A track shoe for an endless track assembly; the track shoe comprising:
    a base;
    a hull;
    the hull further comprising opposing sidewalls; the opposing sidewalls being angled to meet at an apex, forming an inverted V-shape;
    the apex of the hull extending a width of the track shoe;
    the hull having laterally-disposed ridges spaced apart from the apex;
    the ridges tapering outwardly from the hull to form, respectively, a leading lip and a trailing lip of the track shoe;
    the track shoe further comprising opposing ends; and
    each opposing end the track shoe further comprising an upward bend;
    where an extent of the upward bend of each of the opposing ends of the track shoe comprises between approximately 5% and 20% of the width of the track shoe; and,
    where the upward bends of the ends of the track shoe are at an angle between approximately 8 and 20 degrees.

11. An endless track assembly for a tracked vehicle; the endless track assembly comprising a plurality of track shoes operatively connected thereto, each track shoe further comprising:
    a base;
    a hull;
    the hull further comprising opposing sidewalls; the opposing sidewalls being angled to meet at an apex, forming an inverted V-shape;
    the apex of the hull extending a width of the track shoe;
    laterally-disposed ridges spaced apart from the apex; and,
    a height of the ridges tapering outwardly from the hull to form, respectively, a leading lip and a trailing lip of the track shoe.

12. The endless track assembly of claim 11, where:
    each track shoe of the plurality of track shoes further comprises opposing ends;
    and, each opposing end comprises an upward bend.

13. The endless track assembly of claim 12, where an extent of the upward bend of each of the opposing ends of each of the plurality of track shoes comprises between approximately 5% and 20% of the width of each track shoe.

14. The endless track assembly of claim 12, where the upward bends of the opposing ends of each of the plurality of the track shoes are at an angle between approximately 8 and 20 degrees.

15. The endless track assembly of claim 11, where each of the plurality of track shoes further comprises a secondary hull formed between the laterally-disposed ridge nearest the leading lip and the leading lip.

16. The endless track assembly of claim 11, where each of the plurality of track shoes further comprises a secondary hull formed between the laterally-disposed ridge nearest the trailing lip and the trailing lip.

17. The endless track assembly of claim 11, where each of the plurality of track shoes further comprises a hole for debris removal.

18. The endless track assembly of claim 11, where each of the plurality of track shoes further comprises indentations in the leading lip thereof to provide clearance for chain links.

19. The endless track assembly of claim 11, where each of the plurality of track shoes further comprises a plurality of holes for receiving bolts for attachment of the track shoe to a chain link.

* * * * *